United States Patent
Chen et al.

(10) Patent No.: US 11,800,517 B2
(45) Date of Patent: Oct. 24, 2023

(54) METHOD FOR TRANSMITTING DOWNLINK SIGNAL AND TERMINAL DEVICE

(71) Applicant: GUANGDONG OPPO MOBILE TELECOMMUNICATIONS CORP., LTD., Dongguan (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/086,173

(22) Filed: Oct. 30, 2020

(65) Prior Publication Data
US 2021/0051692 A1 Feb. 18, 2021

Related U.S. Application Data

(63) Continuation of application No. PCT/CN2018/090762, filed on Jun. 12, 2018.

(51) Int. Cl.
*H04W 72/12* (2023.01)
*H04L 5/00* (2006.01)
(Continued)

(52) U.S. Cl.
CPC ....... *H04W 72/1273* (2013.01); *H04L 5/0023* (2013.01); *H04L 5/0033* (2013.01); *H04W 72/23* (2023.01)

(58) Field of Classification Search
CPC ......... H04W 72/1273; H04W 72/1289; H04W 72/10; H04L 5/0023; H04L 5/0048
See application file for complete search history.

(56) References Cited

U.S. PATENT DOCUMENTS 10,742,303 B1 * 8/2020 Nilsson ................. H04W 76/27
2018/0007688 A1 1/2018 Fu et al.
(Continued)

FOREIGN PATENT DOCUMENTS

CN 105743626 A 7/2016
RU 2016142276 A 4/2018
(Continued)

OTHER PUBLICATIONS

R1-1803533,"Discussion on Simultaneous PDSCH Reception", Qualcomm Incorporated, 3GPP TSG-RAN WG1 Meeting AH 1801, Feb. 26-Mar. 2, 2018, Athens, Greece (Year: 2018).*
(Continued)

*Primary Examiner* — Aristocratis Fotakis
(74) *Attorney, Agent, or Firm* — Morgan, Lewis & Bockius LLP

(57) ABSTRACT

A method for transmitting a downlink signal comprises: determining, by a terminal device, that at least two downlink signals are to be received in a first detection window; determining, by the terminal device, a receiving scheme for the at least two downlink signals based on transmission information of the at least two downlink signals, wherein the transmission information includes at least one of scheduling information of the at least two downlink signals, transmission configuration of the at least two downlink signals, or information carried in the at least two downlink signals; and receiving, by the terminal device, at least one of the at least two downlink signals in the first detection window based on the receiving scheme for the at least two downlink signals.

20 Claims, 3 Drawing Sheets

200

- 210 The terminal device determines that at least two downlink signals are to be received in a first detection window

- 220 The terminal device determines a receiving scheme of the at least two downlink signals based on transmission information of the at least two downlink signals, where the transmission information includes at least one of schedule information of the at least two downlink signals, transmission configuration of the at least two downlink signals, and information carried in the at least two downlink signals

- 230 The terminal device receives at least one of the at least two downlink signals in the first detection window based on the receiving scheme of the at least two downlink signals

(51) Int. Cl.
*H04W 72/1273* (2023.01)
*H04W 72/23* (2023.01)

(56) References Cited

U.S. PATENT DOCUMENTS

| | | | |
|---|---|---|---|
| 2018/0343653 A1* | 11/2018 | Guo | H04W 72/0446 |
| 2019/0181934 A1* | 6/2019 | Kang | H04B 7/0608 |
| 2019/0239245 A1* | 8/2019 | Davydov | H04W 16/28 |
| 2019/0260445 A1* | 8/2019 | John Wilson | H04B 7/086 |
| 2019/0379506 A1* | 12/2019 | Cheng | H04W 4/02 |
| 2020/0221428 A1* | 7/2020 | Moon | H04L 1/00 |
| 2021/0014883 A1* | 1/2021 | Khoshnevisan | H04L 1/1854 |
| 2021/0022152 A1* | 1/2021 | Yang | H04W 72/10 |

FOREIGN PATENT DOCUMENTS

| | | |
|---|---|---|
| WO | WO2017193377 A1 | 11/2017 |
| WO | WO2018083244 A1 | 5/2018 |

OTHER PUBLICATIONS

R1-1805830, "Simultaneous transmission and reception of different channels and reference signals", ZTE, 3GPP TSG RAN WG1 Meeting #93, Busan, Korea, May 21-25, 2018 (Year: 2018).*
R1-1805955, "Remaining issues on simultaneous reception and transmission over CCs and BWPs", Huawei, HiSilicon, 3GPP TSG RAN WG1 Meeting #93, Busan, Korea, May 21-25, 2018 (Year: 2018).*
R1-1806047, Remaining issues on simultaneous reception of DL/UL physical channels and reference signals, 3GPP TSG RAN WG1 Meeting #93, vivo, Busan, Korea, May 21-25, 2018 (Year: 2018).*
Guangdong OPPO Mobile Telecommunications Corp. Ltd., International Search Report and Written Opinion, PCT/CN2018/090762, dated Feb. 25, 2019, 15 pgs.
3rd Generation Partnership Project, Technical Specification Group Radio Access Network, NR, "Physical layer procedures for data," Release 16, 3GPP TS 38.214, V16.3.0, Sep. 2020, 165 pgs.
3rd Generation Partnership Project, Technical Specification Group Radio Access Network, NR, Radio Resource Control (RRC) protocol specification, Release 16, 3GPP TS 38.331, V16.2.0, Sep. 2020, 916 pgs.
3rd Generation Partnership Project, Technical Specification Group Radio Access Network, NR, User Equipment (UE) Radio access capabilities, Release 16, 3GPP TS 38.306, V16.2.0, Sep. 2020, 110 pgs.
Vivo, "Remaining Issues on Simultaneous Reception of DL/UL Physical Channels and Reference Signals," 3GPP TSG RAN WG1 Meeting #93, R1-1806047, Busan, Korea, May 21-25, 2018, 7 pgs.
Guangdong OPPO Mobile Telecommunications Corp. Ltd., Extended European Search Report, EP21196858.1, dated Oct. 8, 2021, 14 pgs.
Guangdong OPPO Mobile Telecommunications Corp. Ltd., Notice of Priority Review of Patent Application, CN202011191341.3, dated Sep. 16, 2021, 6 pgs.
Guangdong OPPO Mobile Telecommunications Corp. Ltd., First Office Action, CN202011191341.3, dated Sep. 27, 2021, 21 pgs.
Guangdong OPPO Mobile Telecommunications Corp. Ltd., Official Action, RU2020142083, dated Oct. 21, 2021, 15 pgs.
ZTE, Simultaneous transmission and reception of different channels and reference signals, 3GPP TSG RAN WG1 Meeting #93, R1-1805830, Busan, Korea, May 21-25, 2018, 4 pgs.
Guangdong OPPO Mobile Telecommunications Corp. Ltd., Extended European Search Report, EP18922760.6, dated Jan. 18, 2021, 10 pgs.
Intel Corporation, "Summary of offline on simultaneous transmission and reception of channels/signals," 3GPP TSG RAN WG1 Meeting #93, R1-1807818, Busan, Korea, May 21-25, 2018, 20 pgs.
Qualcomm Incorporated, "Remaining Details on QCL," 3GPP TSG-RAN WG1-Meeting #93, R1-1807398, Busan, Korea, May 21-25, 2018, 9 pgs.
Guangdong OPPO Mobile Telecommunications Corp. Ltd., Examination Report, IN202027048615, dated Dec. 7, 2021, 6 pgs.
Guangdong OPPO Mobile Telecommunications Corp. Ltd., First Office Action, JP2020-567195, dated Jun. 28, 2022, 10 pgs.
Guangdong OPPO Mobile Telecommunications Corp. Ltd., First Office Action, KR2020-7034002, dated Jun. 28, 2022, 10 pgs.
Guangdong OPPO Mobile Telecommunications Corp. Ltd., First Office Action, SG11202011646Q, dated Aug. 4, 2022, 11 pgs.
Guangdong OPPO Mobile Telecom, "Discussion on NR Downlink Multi-TRP and Multi-panel Transmission," 3GPP TSG RAN WG1 Meeting #90, R1-1713283, Prague, Czech Republic, Aug. 21-25, 2017, 4 pgs.
OPPO, "Discussion on simultaneous reception/transmission of multiple signals/channels," 3GPP TSG RAN WG1 Meeting # 93, R1-1806842, Busan, Korea, May 21-25, 2018, 3 pgs.
MediaTek Inc., "Simultaneously reception of unicast and broadcast for Rel-13 MTC UE," 3GPP TSG-RAN WG1 Meeting #80, R1-150678, Athens, Greece, Feb. 9-13, 2015, 2 pgs.
Guangdong OPPO Mobile Telecommunications Corp. Ltd., SG11202011646Q, Decision of Rejection, Apr. 26, 2023, 12 pgs.

* cited by examiner

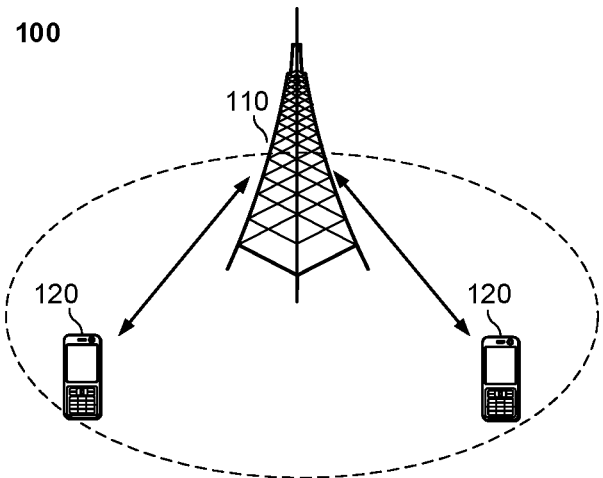

210 — The terminal device determines that at least two downlink signals are to be received in a first detection window 220 — The terminal device determines a receiving scheme of the at least two downlink signals based on transmission information of the at least two downlink signals, where the transmission information includes at least one of schedule information of the at least two downlink signals, transmission configuration of the at least two downlink signals, and information carried in the at least two downlink signals 230 — The terminal device receives at least one of the at least two downlink signals in the first detection window based on the receiving scheme of the at least two downlink signals

FIG. 2

METHOD FOR TRANSMITTING DOWNLINK SIGNAL AND TERMINAL DEVICE

CROSS-REFERENCE TO RELATED APPLICATIONS

The present application is a continuation application of PCT Patent Application No. PCT/CN2018/090762, entitled "METHOD FOR TRANSMITTING DOWNLINK SIGNAL AND TERMINAL DEVICE" filed on Jun. 12, 2018, the content of which is hereby incorporated by reference in its entirety.

TECHNICAL FIELD

Embodiments of the present disclosure relate to the field of communication technologies, and in particular to a downlink signal transmission method and a terminal device.

BACKGROUND

In a New Radio (NR) system, in order to increase downlink transmission throughput, multiple Transmission/Reception Points (TRPs) can be deployed to be independently scheduled for terminal devices and to transmit downlink data. The terminal device needs to detect multiple Downlink Control Information (DCI) simultaneously within a time unit, such as a slot, a symbol, multiple symbols or the like, each DCI corresponding to a separate Physical Downlink Shared Channel (PDSCH), and thus the corresponding PDSCHs are detected separately.

PDSCHs scheduled by different DCIs can be transmitted in the same detection window such the slot or an Orthogonal Frequency Division Multiplexing (OFDM) symbol. Since there is a receiving beam corresponding to each of the PDSCHs, if the receiving beams for the PDSCHs are different, the terminal device needs to use different receiving beams to receive those PDSCHs.

SUMMARY

According to a first aspect, there is provided a downlink signal transmission method that includes:

determining, by a terminal device, that at least two downlink signals are to be received in a first detection window;

determining, by the terminal device, a receiving scheme of the at least two downlink signals based on transmission information of the at least two downlink signals, wherein the transmission information comprises at least one of schedule information of the at least two downlink signals, transmission configurations of the at least two downlink signals, and information carried in the at least two downlink signals; and receiving, by the terminal device, at least one downlink signal of the at least two downlink signals in the first detection window based on the receiving scheme of the at least two downlink signals.

According to a second aspect, there is provided a terminal device for performing the method in the above first aspect or other implementations thereof.

In some embodiments, the terminal device includes functional modules for performing the method in the above first aspect or other implementations thereof.

According to a third aspect, there is provided a terminal device comprising a processor and a memory for storing a computer program, and the processor is configured to revoke and execute the computer program stored in the memory to perform the method in the above first aspect or other implementations thereof.

According to a fourth aspect, there is provided a chip for implementing the method in the above first aspect or other implementations thereof.

In some embodiments, the chip includes g a processor configured to revoke and execute a computer program from a memory to cause a device provided with the chip to perform the method in the above first aspect or other implementations thereof.

According to a fifth aspect, there is provided a computer-readable storage medium for storing a computer program that causes a computer to perform the method in the above first aspect or other implementations thereof.

According to a sixth aspect, there is provided a computer program product comprising computer program instructions that cause a computer to perform the method in the above first aspect or other implementations thereof.

According to a seventh aspect, there is provided a computer program which, when executed on a computer, causes the computer to perform the method in the above first aspect or other implementations thereof.

BRIEF DESCRIPTION OF THE DRAWINGS

In order to clearly describe technical solutions in embodiments of the present disclosure, the accompanying drawings which are referred to in the description of the embodiments or in the related art will be briefly described below. Obviously, the drawings described below show merely some embodiments of the present disclosure, and a person of ordinary skill in the art may still derive other drawings from these accompanying drawings without creative efforts.

FIG. 1 is a schematic diagram of an architecture of a communication system according to an embodiment of the present disclosure.

FIG. 2 is a schematic diagram of a downlink signal transmission method according to an embodiment of the present disclosure.

DETAILED DESCRIPTION

Figure 3:
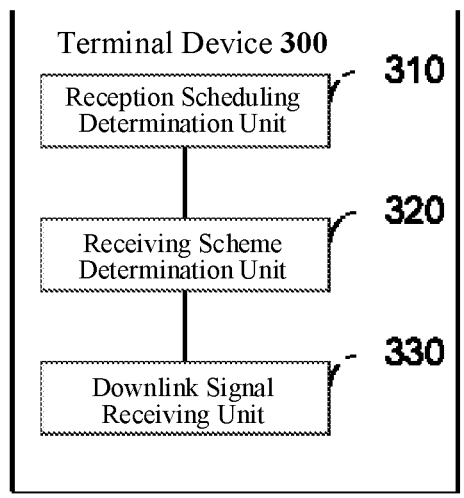
FIG. 3 is a schematic block diagram of a terminal device according to an embodiment of the present disclosure.

Technical solutions in embodiments of the present disclosure are described below in connection with the accompanying drawings in the embodiments of the present disclosure. Obviously, the described embodiments are part of the embodiments of the present disclosure, but not all the embodiments. Based on the embodiments in the present disclosure, all other embodiments obtained by a person of ordinary skill in the art without creative work fall within the protection scope of the present disclosure.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Universal Mobile Telecommunication System (UMTS), a Global Interoperability for Microwave Access (WiMAX) communication system, a 5G system, or the like.

For example, FIG. 1 shows a communications system 100 to which an embodiment of this application is applied. The communication system 100 can include a network device 110 which can be a device that communicates with a terminal device 120 (or referred to as a communication terminal or a terminal). The network device 110 can provide communication coverage for a specific geographic area, and can communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a wireless controller in a Cloud Radio Access Network (CRAN), or the network device can be a mobile switching center, a relay station, an access point, an on-board device, a wearable device, a hub, a switch, a bridge, a router, a network side device in 5G network, a network side device in a future evolved public land mobile network (PLMN) or the like.

The communication system 100 further includes at least one terminal device 120 located within a coverage area of the network device 110. As used herein, the "terminal device" includes, but is not limited to, a device connected via wired lines, such as a Public Switched Telephone Networks (PSTN), a Digital Subscriber Line (DSL), a digital cable or direct cable connection; another data connection/network; wireless interfaces, such as those for cellular networks, a wireless local area network (WLAN), a digital TV network such as DVB-H network, satellite network, an AM-FM broadcast transmitter; a means of another terminal device configured to receive/transmit communication signals; and/or Internet of Things (IoT) devices. A terminal device configured to communicate through a wireless interface may be referred to as a "wireless communication terminal", "wireless terminal", or "mobile terminal". Examples of the mobile terminal include but are not limited to a satellite or cellular phone; a personal communication system (PCS) terminal that can incorporate data processing, facsimile, and data communication capabilities in a cellular radio telephone; a PDA that can include a radio telephone, a pager, Internet/internal network access, a web browser, a notepad, a calendar, and/or a Global Positioning System (GPS) receiver; and a conventional laptop and/or palm-type receiver or other electronic devices including a radio telephone transceiver. The terminal device may refer to an access terminal, User Equipment (UE), a subscriber unit, a user station, a moving station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, an on-board device, a wearable device, a terminal device in a 5G network, a terminal device in a future evolved PLMN, or the like.

Optionally, Device to Device (D2D) communication can be performed between the terminal devices 120.

Optionally, the 5G system or 5G network may also be referred to as a New Radio (NR) system or NR network.

FIG. 1 illustrates a network device and two terminal devices. Alternatively, the communication system 100 may include a plurality of network devices, and a different number of terminal devices may be included within the coverage area of each of the network devices, which is not limited in the embodiments of the present disclosure.

Optionally, the communication system 100 can further include other network entities such as a network controller, a mobility management entity or the like, which is not limited in the embodiments of the present disclosure.

It should be understood that the device with the communication function in the network/system in the embodiments of the present disclosure can be referred to as a communication device. For instance, in the communication system 100 shown in FIG. 1, the communication device can include the network device 110 and the terminal device 120 which have the communication function, and the network device 110 and the terminal device 120 can be any of the specific devices described above, which will not be repeated here. The communication device can also include other devices in the communication system 100, such as a network controller, a mobility management entity, or other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

FIG. 2 is a schematic diagram of a downlink signal transmission method according to an embodiment of the present disclosure.

In 210, the terminal device determines that at least two downlink signals are to be received in a first detection window.

In 220, the terminal device determines a receiving scheme of the at least two downlink signals based on transmission information of the at least two downlink signals, where the transmission information includes at least one of schedule information of the at least two downlink signals, transmission configuration of the at least two downlink signals, and information carried in the at least two downlink signals.

In 230, the terminal device receives at least one downlink signal of the at least two downlink signals in the first detection window based on the receiving scheme of the at least two downlink signals.

It should be noted that the downlink signals involved in the present disclosure can include but are not limited to a Physical Downlink Shared Channel (PDSCH), a Physical Downlink Control Channel (PDCCH), or a Channel State Information Reference Signal (CSI-RS), which is not specifically limited in the embodiments.

Optionally, in a possible implementation of the embodiments, the transmission configuration can include but is not limited to:

a receiving beam used for receiving a corresponding downlink signal;

a reference signal with Quasi-Co-Located (QCL) type D used for receiving the corresponding downlink signal;

a Transmission Configuration Indicator (TCI) state used for receiving the corresponding downlink signal;

a mapping type assumed for receiving the corresponding downlink signal; and/or a time window used for receiving the corresponding downlink signal.

Optionally, in a possible implementation of the embodiments, each of the at least two downlink signals can be scheduled by separate Downlink Control Information (DCI). For aperiodic CSI-RS, it can be triggered by the separate DCI.

Specifically, the separate DCI may be DCIs received at different times, or DCIs in different DCI formats, which is not particularly limited in the embodiments.

Optionally, in a possible implementation of the embodiments, physical resources occupied by different downlink signals of the at least two downlink signals are overlapped, and thus, these PDSCHs cannot be received by the terminal device simultaneously in the first detection window.

Optionally, in a possible implementation of the embodiments, different downlink signals of the at least two downlink signals have different transmission configurations, and thus only one transmission configuration can be used in the first detection window by the terminal device in the reception, and the PDSCHs cannot be received by using the respective transmission configurations corresponding thereto.

For example, the reference signals included in the TCI states of different downlink signals of the at least two downlink signals are different.

As another example, the reference signals with QCL type D included in the TCI states of different downlink signals of the at least two downlink signals are different.

As another example, the reference signals with QCL type D included in the TCI states of different downlink signals of the at least two downlink signals are not Quasi-Co-Located.

Optionally, in a possible implementation of the embodiments, the first detection window can include but is not limited to the following time units:

a slot;

at least two slots;

an Orthogonal Frequency Division Multiplexing (OFDM) symbol; or at least two OFDM symbols.

For example, taking the PDSCH as an example of the downlink signal, the first detection window can be a slot. If the terminal device is scheduled with multiple PDSCHs in one slot, and the physical resources occupied by the multiple PDSCHs overlap, the terminal device may not be able to simultaneously demodulate the multiple PDSCHs, and a reception priority should be determined. If the terminal device is scheduled with multiple PDSCHs in one slot and the reference signals with QCL type D of the multiple PDSCHs are different (i.e., need to be received by using different receiving beams), the terminal device may not be able to receive these PDSCHs by using multiple receiving beams simultaneously in the time window, and can use only one single receiving beam in reception. In this case, the reception priority is necessary to be determined.

As another example, taking the PDSCH as an example of the downlink signal, the first detection window may be a time window from when the terminal device detects a DCI to a completion of transmission of the PDSCH scheduled by the DCI. If the terminal device receives in the time window another DCI which requires to transmit another PDSCH in this time window, the terminal device needs to receive two PDSCHs simultaneously in this time window. The transmission configurations of the two PDSCHs may be different, and the terminal device may not have time to switch the transmission configuration within this time window, and thus it is necessary to determine the reception priority.

As another example, taking the PDSCH as an example of the downlink signal, the first detection window may be a time window with a time length of T, where T is the time required for the terminal device to switch the receiving beam. If the terminal device needs to simultaneously receive two PDSCHs in one time window, and the reference signals with QCL type D of the two PDSCHs are different (i.e., need to be received by using different receiving beams), the terminal device may not be able to simultaneously receive these two PDSCHs by using different receiving beams in this time window, and it is necessary to determine the reception priority.

Optionally, in a possible implementation of the embodiments, in 220, the terminal device can specifically determine whether to receive at least one of the at least two downlink signals based on the transmission information of the at least two downlink signals, or determine the transmission configuration used for receiving the at least one of the at least two downlink signals based on the transmission information of the at least two downlink signals, which is not particularly limited in the embodiment.

It should be noted that the transmission configuration here may be a receiving beam for receiving the PDSCH, a reference signal included in the TCI state of the PDSCH, or a reference signal with QCL type D which is used as a reference, which is not particularly limited in the embodiment.

The reference signal involved in the present disclosure can include but is not limited to a CSI-RS, a Synchronization Signal Block (SSB), or a Tracking Reference Signal (TRS), which is not particularly limited in the embodiment.

The SSB, i.e., a SS/PBCH block, is constituted by a primary synchronization signal (PSS), a secondary synchronization signal (SSS) and a physical broadcast channel (PBCH).

Optionally, in a possible implementation of the embodiments, in 220, the transmission information includes scheduling information of the at least two downlink signals, and the terminal device can determine the receiving scheme of each of the at least two downlink signals by using the following method.

In a specific implementation, the terminal device can determine the receiving scheme of the at least two downlink signals based on a receiving order of the DCIs that schedule the at least two downlink signals.

For example, taking the PDSCH as an example of the downlink signal, the terminal device receives the PDSCH scheduled by the DCI that is received first, and does not receive the PDSCHs scheduled by the DCIs that are received later.

As another example, taking the PDSCH as an example of the downlink signal, the terminal device receives the at least two PDSCHs by using the PDSCH transmission configuration (e.g., the reference signal with QCL type D or the receiving beam) scheduled by the DCI that is received first.

In another specific implementation, the terminal device determines the receiving scheme of the at least two downlink signals based on a DCI format of the DCIs that schedule the at least two downlink signals.

For example, taking the PDSCH as an example of the downlink signal, the terminal device prioritizes reception of the PDSCH scheduled by DCI format 1_0 in the at least two PDSCHs, and does not receive the PDSCH scheduled by DCI format 1_1.

As another example, taking the PDSCH as an example of the downlink signal, the terminal device uses the PDSCH transmission configuration of the PDSCH scheduled by DCI format 1_0 in the at least two PDSCHs (for example, the reference signal with QCL type D or the receiving beam) to receive the at least two PDSCHs, including the PDSCH scheduled by DCI format 1_1.

In another specific implementation, the terminal device determines the receiving scheme of the at least two downlink signals based on a scrambling scheme of cyclic redundancy check (CRC) of the DCIs that schedule the at least two downlink signals.

For example, taking the PDSCH as an example of the downlink signal, the terminal device prioritizes the reception of the PDSCH scheduled by the DCI which is scrambled by a Cell Radio Network Temporary Identifier (C-RNTI) in the at least two PDSCHs, and does not receive the PDSCH scheduled by the DCI which is scrambled by a Circuit Switched Radio Network Temporary Identifier (CS-RNTI).

As another example, taking the PDSCH as an example of the downlink signal, the terminal device uses the transmission configuration of the PDSCH scheduled by the DCI which is scrambled by C-RNTI (for example, the reference signal with QCL type D or the receiving beam) in the at least two PDSCHs to receive the at least two PDSCHs, including the PDSCH scheduled by the DCI which is scrambled by CS-RNTI.

In another specific implementation, the terminal device determines the receiving scheme of the at least two downlink signals based on search spaces or control resource sets (CORESETs) including the DCIs which schedule the at least two downlink signals.

For example, taking the PDSCH as an example of the downlink signal, the terminal device prioritizes the reception of the PDSCH scheduled by the DCI which is detected in a common search space, and does not receive the PDSCH scheduled by the DCI detected in a user equipment (UE) specific search space.

As another example, taking the PDSCH as an example of the downlink signal, the terminal device uses the transmission configuration of the PDSCH scheduled by the DCI which is detected in the common search space (for example, the reference signal with QCL type D or the receiving beam) to receive the at least two PDSCHs, including the PDSCH scheduled by the DCI which is detected in the UE-specific search space.

In another specific implementation, the terminal device determines the receiving scheme of each of the at least two downlink signals based on a time offset between the DCI in each of the at least two downlink signals and the downlink signal scheduled by the DCI.

For example, taking the PDSCH as an example of the downlink signal, the terminal device prioritizes the reception of the PDSCH with a shorter time offset between the DCI scheduling the PDSCH and the scheduled PDSCH, and does not receive the PDSCH with a longer time offset between the DCI scheduling the PDSCH and the scheduled PDSCH.

As another example, taking the PDSCH as an example of the downlink signal, the terminal device uses the transmission configuration of the PDSCH with a shorter time offset between the DCI scheduling the PDSCH and the scheduled PDSCH in the at least two PDSCHs (for example, the reference signal with QCL type D or the receiving beam) to receive the at least two PDSCHs, including the PDSCH with a longer time offset between the DCI scheduling the PDSCH and the scheduled PDSCH.

Specifically, the terminal device can determine the receiving scheme of each of the at least two downlink signals based on whether the time offset between the DCI scheduling each downlink signal of the at least two downlink signals and the scheduled downlink signal is greater than a first time threshold that is preset or not.

The first time threshold can be a time length reported by the terminal device or a time length configured by a network device, which is not particularly limited in the embodiment.

For example, the terminal device prioritizes the reception of the PDSCH with the time offset between the DCI scheduling the PDSCH and the PDSCH that exceeds the preset first time threshold, and does not receive the PDSCH with the time offset between DCI scheduling the PDSCH and the PDSCH that is less than the preset first time threshold. If there are multiple PDSCHs with the time offset that is greater or less than the preset first time threshold, the determination can be performed according to other conditions.

As another example, the terminal device uses the transmission configuration of the PDSCH with the time offset between the DCI scheduling the PDSCH and the PDSCH that exceeds the preset first time threshold (e.g., the reference signal with QCL type D or the receiving beam) in the at least two PDSCHs to receive the at least two PDSCHs, including the PDSCH with the time offset between the DCI scheduling the PDSCH and the PDSCH that is less than the preset first time threshold. If there are multiple PDSCHs with the time offset that is greater or less than the preset first time threshold, the determination can be performed according to other conditions.

Optionally, in a possible implementation of the embodiments, in 220, the transmission information includes the transmission configurations of the at least two downlink signals, and the terminal device can determine the receiving scheme of each of the at least two downlink signals by using the following method.

In a specific implementation, the terminal device determines the receiving scheme of the at least two downlink signals based on whether the TCI states of the at least two downlink signals include the reference signal with QCL type D or not.

For example, taking the PDSCH as an example of the downlink signal, the terminal device prioritizes the reception of the PDSCH of the at least two PDSCHs for which the reference signal with QCL type D is included in the corresponding TCI state, and does not receive the PDSCH for which the reference signal with QCL type D is not included in the corresponding TCI state.

As another example, taking the PDSCH as an example of the downlink signal, the terminal device uses the transmission configuration of the PDSCH for which the reference signal with QCL type D is included in the corresponding TCI state (for example, the reference signal with QCL type D or the receiving beam) in the at least two PDSCHs to receive the at least two PDSCHs, including the PDSCH for which the reference signal with QCL type D is not included in the corresponding TCI state.

In a specific implementation, the terminal device determines the receiving scheme of the at least two downlink signals based on a type of the reference signals included in the TCI states of the at least two downlink signals.

For example, taking the PDSCH as an example of the downlink signal, the terminal device prioritizes the reception of the PDSCH for which the reference signal included in the corresponding TCI state is the CSI-RS in the at least two PDSCHs, and does not receive the PDSCH for which the reference signal included in the corresponding TCI state is the SSB.

As another example, taking the PDSCH as an example of the downlink signal, the terminal device uses the transmission configuration of the PDSCH for which the reference signal included in the corresponding TCI state is the CSI-RS (for example, the reference signal with QCL type D or the receiving beam) in the at least two PDSCHs to receive the at least two PDSCHs, including the PDSCH for which the reference signal included in the corresponding TCI state is the SSB.

In a specific implementation, the terminal device determines the receiving scheme of the at least two downlink signals based on a type of the reference signals with QCL type D included in the TCI states of the at least two downlink signals.

For example, taking the PDSCH as an example of the downlink signal, the terminal device prioritizes the reception of the PDSCH of the at least two PDSCHs for which the reference signal with QCL type D included in the corresponding TCI state is the CSI-RS, and does not receive the PDSCH for which the reference signal with QCL type D included in the corresponding TCI state is the SSB.

As another example, taking the PDSCH as an example of the downlink signal, the terminal device uses the transmission configuration of the PDSCH for which the reference signal with QCL type D included in the corresponding TCI state is the CSI-RS (for example, the reference signal with QCL type D or the receiving beam) in the at least two PDSCHs to receive the at least two PDSCHs, including the PDSCH for which the reference signal with QCL type D included in the corresponding TCI state is the SSB.

In another specific implementation, the terminal device determines the receiving scheme of the at least two downlink signals based on a mapping type of the at least two downlink signals. Here, the mapping type refers to primarily the mapping type of the PDSCH, and different mapping types may correspond to different PDSCH starting symbols and PDSCH durations (the number of the symbols).

For example, taking the PDSCH as an example of the downlink signal, the terminal device prioritizes the reception of the PDSCH with the mapping type of type B in the at least two PDSCHs, and does not receive PDSCH with the mapping type of type A.

As another example, taking the PDSCH as an example of the downlink signal, the terminal device uses the transmission configuration of the PDSCH with the mapping type of type B (for example, the reference signal with QCL type D or the receiving beam) in the at least two PDSCHs to receive the at least two PDSCHs, including the PDSCH with the mapping type of type A.

In another specific implementation, the terminal device determines the receiving scheme of the at least two downlink signals based on a duration of the at least two downlink signals.

For example, taking the PDSCH as an example of the downlink signal, the terminal device prioritizes the reception of the PDSCH with a shorter duration in the at least two PDSCHs, and does not receive the PDSCH with a longer duration. Conversely, the terminal device can also prioritizes the reception of the PDSCH with the longer duration in the at least two PDSCHs, and does not receive the PDSCH with the shorter duration.

As another example, taking the PDSCH as an example of the downlink signal, the terminal device uses the transmission configuration of the PDSCH with the shorter duration in the at least two PDSCHs (for example, the reference signal with QCL type D or the receiving beam) to receive the at least two PDSCHs, including the PDSCH with the longer duration. Conversely, the terminal device can also use the transmission configuration of the PDSCH with the longer duration (e.g., the reference signal with QCL type D or the receiving beam) in the at least two PDSCHs to receive the at least two PDSCHs, including the PDSCH with the shorter duration.

Optionally, in a possible implementation of the embodiments, in 220, the transmission information includes information carried in the at least two downlink signals, and the terminal device can determine the receiving scheme of each of the at least two downlink signals by using the following method.

In a specific implementation, the terminal device determines the receiving scheme of the at least two downlink signals based on whether system information is carried in the at least two downlink signals or not.

For example, taking the PDSCH as an example of the downlink signal, the terminal device prioritizes the reception of the PDSCH carrying the system information in the at least two PDSCHs, and does not receive the PDSCH carrying only ordinary data.

As another example, taking the PDSCH as an example of the downlink signal, the terminal device uses the transmission configuration of the PDSCH carrying the system information in the at least two PDSCHs (for example, the reference signal with QCL type D or the receiving beam) to receive the at least two PDSCHs, including the PDSCH that does not carry the system information.

In a specific implementation, the terminal device determines the receiving scheme of the at least two downlink signals based on whether high-layer signaling is carried in the at least two downlink signals or not.

For example, taking the PDSCH as an example of the downlink signal, the terminal device prioritizes the reception of the PDSCH carrying the high-layer signaling in the at least two PDSCHs, and does not receive the PDSCH carrying only ordinary data.

As another example, taking the PDSCH as an example of the downlink signal, the terminal device uses the transmission configuration of the PDSCH carrying the high-layer signaling in the at least two PDSCHs (for example, the reference signal with QCL type D or the receiving beam) to receive the at least two PDSCHs, including the PDSCH that does not carry the high-layer signaling.

It can be understood that the terminal device can determine the receiving scheme of each of the at least two downlink signals by combining the above technical solutions in various embodiments and implementations, which is not particularly limited in this embodiment.

Optionally, in a possible implementation of the embodiments, in 220, specifically, the terminal device can determine a priority of each of the at least two downlink signals based on the transmission information of the at least two downlink signals, and can in turn determine the receiving scheme of the at least two downlink signals based on the priority of each downlink signal.

In a specific implementation, specifically, the terminal device can determine the priority of each of the at least two downlink signals based on the receiving order of the DCIs scheduling the at least two downlink signals, the DCI formats of the DCIs scheduling the at least two downlink signals, the scrambling schemes of CRC of the DCIs scheduling the at least two downlink signals, the search spaces or control resource sets including the DCIs scheduling the at least two downlink signals, the time offset between the DCI scheduling each of the at least two downlink signals and the scheduled downlink signal, whether the QCL type reference signal is included in the TCI states of the at least two downlink signals or not, the types of the reference signals included in the TCI states of the at least two downlink signals, the types of the reference signals with QCL type D included in the TCI states of the at least two downlink signals, the mapping types of the at least two downlink signals, the durations of the at least two downlink signals, whether the system information is carried in the at least two downlink signals or not, or whether the high-layer signaling is carried in the at least two downlink signals or not.

It can be understood that the terminal device can determine the priority of each of the at least two downlink signals by combining the above multiple conditions. For example, the priority order is first determined based on a condition A, and in the case where the condition A is the same, the priority order is further determined based on a condition B.

For example, taking the PDSCH as an example of the downlink signal, the earlier the PDSCH scheduled by the DCI, the higher the priority of the PDSCH.

As another example, taking the PDSCH as an example of the downlink signal, the priority of the PDSCH scheduled by DCI format 1_0 is higher than that of the PDSCH scheduled by DCI format 1_1.

As another example, taking the PDSCH as an example of the downlink signal, the priority of the PDSCH scheduled by the DCI detected in the common search space is higher than that of the PDSCH scheduled by the DCI detected in the UE-specific search space.

As another example, taking the PDSCH as an example of the downlink signal, the PDSCH scheduled by the DCI which is scrambled by the RNTI other than the C-RNTI and the CS-RNTI has the highest priority, followed by the PDSCH scheduled by the DCI which is scrambled by the C-RNTI, and the PDSCH scheduled by the DCI which is scrambled by the CS-RNTI has the lowest priority.

As another example, taking the PDSCH as an example of the downlink signal, the PDSCH for which the reference signal with QCL type D is included in the corresponding TCI state has a higher priority than the PDSCH for which the reference signal with QCL type D is not included in the corresponding TCI state.

As another example, taking the PDSCH as an example of the downlink signal, the shorter the time offset between the DCI scheduling the PDSCH and the scheduled PDSCH, the higher the priority of the corresponding PDSCH.

As another example, taking the PDSCH as an example of the downlink signal, the PDSCH with the time offset between the DCI scheduling the PDSCH and the scheduled PDSCH that is greater than a preset second time threshold has a higher priority than the PDSCH with the time offset that is less than the preset second time threshold.

As another example, taking the PDSCH as an example of the downlink signal, the priority order of the PDSCHs for the types of the reference signals included in the TCI states is: TRS>CSI-RS>SSB, and the higher the priority of the reference signal, the higher the priority of the corresponding PDSCH.

As another example, taking the PDSCH as an example of the downlink signal, the priority order of the PDSCHs for the types of the reference signals with QCL type D included in the TCI states is: TRS>CSI-RS>SSB, and the higher the priority of the reference signal with QCL type D, the higher the priority of the corresponding PDSCH.

As another example, taking the PDSCH as an example of the downlink signal, the PDSCH with the mapping type of type B has a higher priority than that with the mapping type of type A.

As another example, taking the PDSCH as an example of the downlink signal, the shorter the duration of the PDSCH, the higher the priority of the PDSCH, or conversely, the longer the duration of the PDSCH, the higher the priority of the PDSCH.

As another example, taking the PDSCH as an example of the downlink signal, the PDSCH carrying the system information has a higher priority than that carrying no system information.

As another example, taking the PDSCH as an example of the downlink signal, the PDSCH carrying the high-layer signaling has a higher priority than that carrying no high-layer signaling.

In another specific implementation, the terminal device can determine the receiving scheme of the at least two downlink signals based on the priority of each downlink signal by using the following method.

For example, the terminal device determines to receive the downlink signal with a higher priority and not to receive the downlink signal with a lower priority.

As another example, the terminal device determines to use the transmission configuration of the downlink signal with the higher priority to receive the at least two downlink signals, including the downlink signal with the lower priority.

According to the technical solutions provided in the present disclosure, the terminal device can determine the priority of the reception of the multiple downlink signals when determining that the multiple downlink signals collide in one detection window or when the receiving beams of the downlink signals are different, thereby ensuring demodulation performance of the downlink signals with the high priority.

Optionally, in a possible implementation of the embodiments, in 220, specifically, the terminal device can determine the receiving scheme of the at least two downlink signals based on the number of antenna panels in the terminal device and the transmission information of the at least two downlink signals.

In a specific implementation, if the number K of the antenna panels is less than the number N of the at least two downlink signals, the terminal device selects the K downlink signals with the highest priorities from the N downlink signals based on the transmission information of the N downlink signals, and determines to receive the K downlink signals by using the transmission configurations of the K downlink signals, respectively.

For example, taking the PDSCH as an example of the downlink signal, if the terminal device has the number K of antenna panels and K<N, the terminal device can select the K PDSCHs with the highest priorities from the N PDSCHs based on the transmission information of the N PDSCHs by using the technical solutions provided in the foregoing possible implementations, and receive the K PDSCHs by using the transmission configurations of the K PDSCHs, respectively. At the same time, the K PDSCHs can be received by using the K antenna panels, respectively.

The terminal device may not receive the other PDSCHs than the K PDSCHs, or may use the transmission configurations of the K PDSCHs to receive the other PDSCHs.

Typically, K=1, N=2 or 3, and one signal with the highest priority is selected from the two or three signals; and/or K=2, N=3, and it is necessary to select two signals with the highest priorities from the three signals.

In another specific implementation, if the number K of the antenna panels is greater than or equal to the number N of the at least two downlink signals, the terminal device determines to use the transmission configurations of the N downlink signals to receive the N downlink signals, respectively.

For example, taking the PDSCH as an example of the downlink signal, if the terminal device has K antenna panels and K the terminal device can receive the N PDSCHs by using the respective transmission configurations of the N PDSCHs. At the same time, the N PDSCHs can be received by using the N antenna panels, respectively.

In the embodiment, the terminal device determines that at least two downlink signals are to be received in the first detection window, and then determines the receiving scheme of the at least two downlink signals based on the transmission information of the at least two downlink signals, so that the terminal device can receive at least one of the at least two downlink signals in the first detection window in the receiving scheme of the at least two downlink signals, thereby realizing the reception of the multiple downlink signals by the terminal device.

It should be noted that, for the sake of concise description, in the foregoing method embodiments, combinations of a sequence of actions are described, but those skilled in the art should understand that the present disclosure is not limited to the described sequence of the actions and certain steps can be performed in other orders or simultaneously according to the present disclosure. Also, those skilled in the art should understand that the embodiments described in the description are all preferred embodiments, and the actions and modules involved are not necessarily required in the present disclosure.

In the above embodiments, the description of each of the embodiments has its own focus, and for the part that is not detailed in any embodiment, reference can be made to the related description of the other embodiments.

FIG. 3 is a schematic block diagram of a terminal device 300 according to an embodiment of the present disclosure. The terminal device provided in this embodiment may include a reception scheduling determination unit 310, a receiving scheme determination unit 320, and a downlink signal receiving unit 330. The reception scheduling determination unit 310 is configured to determine that at least two downlink signals are to be received in a first detection window; the receiving scheme determination unit 320 is configured to determine a receiving scheme of the at least two downlink signals based on transmission information of the at least two downlink signals, where the transmission information includes at least one of scheduling information of the at least two downlink signals, transmission configurations of the at least two downlink signals, or information carried in the at least two downlink signals; and the downlink signal receiving unit 330 is configured to receive at least one downlink signal of the at least two downlink signals in the first detection window based on the receiving scheme of the at least two downlink signals.

It should be noted that the downlink signals involved in the present disclosure can include but are not limited to a PDSCH, a PDCCH, or a CSI-RS, which is not specifically limited in the embodiments.

Optionally, in a possible implementation of the embodiments, the transmission configuration can include but is not limited to:

a receiving beam used for receiving a corresponding downlink signal; or a reference signal with QCL type D used for receiving the corresponding downlink signal.

Optionally, in a possible implementation of the embodiments, each of the at least two downlink signals can be scheduled by the separate DCI.

Optionally, in a possible implementation of the embodiments, the physical resources occupied by different downlink signals of the at least two downlink signals are overlapped, and thus these PDSCHs cannot be received by the terminal device simultaneously in the first detection window.

Optionally, in a possible implementation of the embodiments, different downlink signals in the at least two downlink signals have different transmission configurations, and thus the terminal device cannot receive the PDSCHs by using the respective transmission configurations of the PDSCHs in the first detection window.

For example, the reference signals included in the TCI states of different downlink signals of the at least two downlink signals are different.

As another example, the reference signals with QCL type D included in the TCI states of different downlink signals of the at least two downlink signals are different.

As another example, the reference signals with QCL type D included in the TCI states of different downlink signals of the at least two downlink signals are not Quasi-Co-Located.

Optionally, in a possible implementation of the embodiments, the first detection window can include but is not limited to the following time units:

a slot;

at least two slots;

an OFDM symbol; or at least two OFDM symbols.

Optionally, in a possible implementation of the embodiments, the receiving scheme determination unit 320 can be specifically configured to:

determine, based on the transmission information of the at least two downlink signals, whether to receive at least one of the at least two downlink signals; and/or determine, based on the transmission information of the at least two downlink signals, the transmission configuration for receiving the at least one of the at least two downlink signals.

Optionally, in a possible implementation of the embodiments, the transmission information includes scheduling information of the at least two downlink signals, and the receiving scheme determination unit 320 can be specifically configured to:

determine the receiving scheme of the at least two downlink signals based on a receiving order of the DCIs that schedule the at least two downlink signals;

determine the receiving scheme of the at least two downlink signals based on a DCI format of the DCIs that schedule the at least two downlink signals;

determine the receiving scheme of the at least two downlink signals based on a scrambling scheme of CRC of the DCIs that schedule the at least two downlink signals;

determine the receiving scheme of the at least two downlink signals based on search spaces or control resource sets including the DCIs that schedule the at least two downlink signals; and/or determine the receiving scheme of each of the at least two downlink signals based on a time offset between the DCI in each of the at least two downlink signals and the downlink signal scheduled by the DCI.

Specifically, the receiving scheme determination unit 320 can be configured to determine the receiving scheme of each of the at least two downlink signals based on whether the time offset between the DCI that schedules each of the at least two downlink signals and the scheduled downlink signal is greater than a preset first time threshold or not.

Optionally, in a possible implementation of the embodiments, the transmission information includes the transmission configurations of the at least two downlink signals, and the receiving scheme determination unit 320 can be specifically configured to:

determine the receiving scheme of the at least two downlink signals based on whether the TCI states of the at least two downlink signals include the reference signal with QCL type D or not;

determine the receiving scheme of the at least two downlink signals based on a type of the reference signal included in the TCI states of the at least two downlink signals;

determine the receiving scheme of the at least two downlink signals based on a type of the reference signal with QCL type D included in the TCI states of the at least two downlink signals;

determine the receiving scheme of the at least two downlink signals based on a mapping type of the at least two downlink signals; and/or determine the receiving scheme of the at least two downlink signals based on a duration of the at least two downlink signals.

Optionally, in a possible implementation of the embodiments, the transmission information includes the information carried in the at least two downlink signals, and the receiving scheme determination unit 320 can be specifically configured to:

determine the receiving scheme of the at least two downlink signals based on whether system information is carried in the at least two downlink signals or not; and/or determine the receiving scheme of the at least two downlink signals based on whether high-layer signaling is carried in the at least two downlink signals or not.

Optionally, in a possible implementation of the embodiments, the receiving scheme determination unit 320 can be specifically configured to determine a priority of each of the at least two downlink signals based on the transmission information of the at least two downlink signals, and determine the receiving scheme of the at least two downlink signals based on the priority of each downlink signal.

Specifically, the receiving scheme determination unit 320 can be specifically configured to:

determine to receive the downlink signal with a higher priority and not to receive the downlink signal with a lower priority; and/or determine to receive the at least two downlink signals by using the transmission configuration of the downlink signal with the higher priority.

Optionally, in a possible implementation of the embodiments, the receiving scheme determination unit 320 can be specifically configured to determine the receiving scheme of the at least two downlink signals based on the number of antenna panels in the terminal device and the transmission information of the at least two downlink signals.

In a specific implementation, the receiving scheme determination unit 320 can be configured to select a number K of downlink signals with the highest priorities from a number N of downlink signals based on the transmission information of the N downlink signals if the number K of the antenna panels is less than the number N of the at least two downlink signals, and determine to receive the K downlink signals by using the transmission configurations of the K downlink signals, respectively.

In another specific implementation, the receiving scheme determination unit 320 can be specifically configured to determine to receive the N downlink signals by using the transmission configurations of the N downlink signals, respectively, if the number K of the antenna panels is greater than or equal to the number N of the at least two downlink signals.

It should be noted that the method performed by the terminal device in the embodiment shown in FIG. 2 can be applied to implement the corresponding functions implemented by the terminal device in the foregoing methods. For detailed description, reference can be made to the related content in the embodiment shown in FIG. 2, which will not be repeated here.

In the embodiment, the terminal device determines, by the reception schedule determination unit, that at least two downlink signals are to be received in the first detection window, and determines, by the receiving scheme determination unit, the receiving scheme of the at least two downlink signals based on the transmission information of the at least two downlink signals, so that the downlink signal receiving unit can receive at least one of the at least two downlink signals in the first detection window in the receiving scheme of the at least two downlink signals, thereby realizing the reception of the multiple downlink signals by the terminal device.

Figure 4:
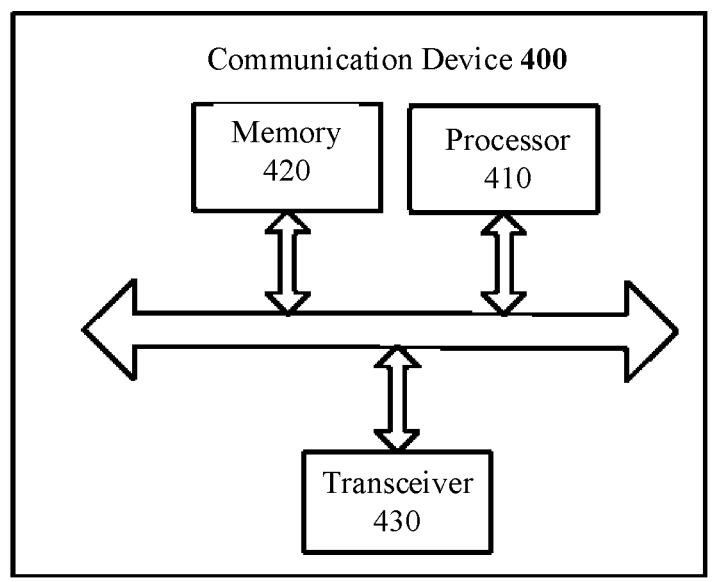
FIG. 4 is a schematic block diagram of a terminal device according to an embodiment of the present disclosure.

FIG. 4 is a schematic structural diagram of a communication device 400 according to an embodiment of the present disclosure. The communication device 400 shown in FIG. 4 includes a processor 410 which can invoke and execute a computer program from a memory to perform the methods in the embodiments of the present disclosure.

Optionally, as shown in FIG. 4, the communication device 400 can further include a memory 420. The processor 410 can invoke and execute the computer program from the memory 420 to perform the methods in the embodiments of the present disclosure.

The memory 420 can be a separate device independent of the processor 410, or can be integrated in the processor 410.

It should be understood that the processor in the embodiments of the present disclosure can be an integrated circuit chip, which has signal processing capabilities. In implementations, the steps of the foregoing method embodiments can be performed by an integrated logic circuit of hardware in the processor or instructions in a form of software. The foregoing processor can be a general-purpose processor, a Digital Signal Processor (DSP), an Application Specific Integrated Circuit (ASIC), a Field Programmable Gate Array (FPGA), or another programmable logic device, discrete gate or transistor logic device, or discrete hardware component. The methods, steps, and logical blocks disclosed in the embodiments of the present disclosure can be implemented or performed. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure can be a volatile memory or a non-volatile memory, or both. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM), which is used as an external cache. By way of example but not limitation, many forms of RAM are available, such as a Static RAM (SRAM), a Dynamic RAM (DRAM), a Synchronous DRAM (SDRAM), a Double SDRAM (DDR SDRAM), an Enhanced SDRAM (ESDRAM), a Synch-Link DRAM (SLDRAM) and a Direct Rambus RAM (DR RAM). It should be noted that the memories of the systems and methods described herein are intended to include, but are not limited to those and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

Optionally, as shown in FIG. 4, the communication device 400 can further include a transceiver 430, and the processor 410 can control the transceiver 430 to communicate with other devices. Specifically, it can transmit information or data to other devices, or receive information or data transmitted from other devices.

The transceiver 430 can include a transmitter and a receiver. The transceiver 430 can further include one or more antennas.

Optionally, the communication device 400 can specifically be the network device in the embodiments of the present disclosure, and the communication device 400 can implement the corresponding processes which are implemented by the network device in the methods of the embodiments of the present disclosure. For the sake of brevity, a repetition is omitted here.

Optionally, the communication device 400 can specifically be the mobile terminal device/terminal device in the embodiments of the present disclosure, and the communication device 400 can implement the corresponding processes which are implemented by the mobile terminal device/terminal device in the methods of the embodiments of the present disclosure. For the sake of brevity, a repetition will be omitted here.

Figure 5:
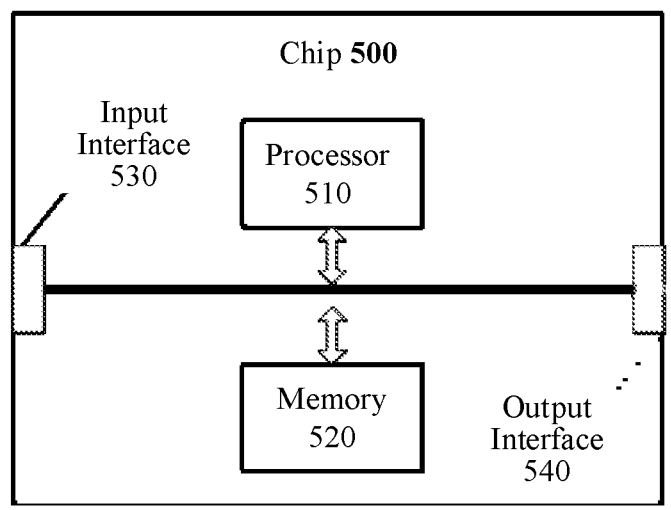
FIG. 5 is a schematic block diagram of a chip according to an embodiment of the present disclosure.

FIG. 5 is a schematic structural diagram of a chip according to an embodiment of the present disclosure. The chip 500 shown in FIG. 5 includes a processor 510 which can invoke and execute a computer program from a memory to implement the methods in the embodiments of the present disclosure.

Optionally, as shown in FIG. 5, the chip 500 can further include a memory 520. The processor 510 can invoke and execute the computer program from the memory 520 to implement the methods in the embodiments of the present disclosure.

The memory 520 can be a separate device independent of the processor 510, or can be integrated in the processor 510.

It should be understood that the processor in the embodiments of the present disclosure can be an integrated circuit chip, which has signal processing capabilities. In implementations, the steps of the foregoing method embodiments can be performed by an integrated logic circuit of hardware in the processor or instructions in a form of software. The foregoing processor can be a general-purpose processor, a Digital Signal Processor (DSP), an Application Specific Integrated Circuit (ASIC), a Field Programmable Gate Array (FPGA), or another programmable logic device, discrete gate or transistor logic device, or discrete hardware component. The methods, steps, and logical blocks disclosed in the embodiments of the present disclosure can be implemented or performed. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure can be a volatile memory or a non-volatile memory, or both. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM), which is used as an external cache. By way of example but not limitation, many forms of RAM are available, such as a Static RAM (SRAM), a Dynamic RAM (DRAM), a Synchronous DRAM (SDRAM), a Double SDRAM (DDR SDRAM), an Enhanced SDRAM (ESDRAM), a Synch-Link DRAM (SLDRAM) and a Direct Rambus RAM (DR RAM). It should be noted that the memories of the systems and methods described herein are intended to include, but are not limited to those and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

Optionally, the chip 500 can further include an input interface 530. The processor 510 can control the input interface 530 to communicate with other devices or chips, and specifically, can obtain information or data transmitted from other devices or chips.

Optionally, the chip 500 can further include an output interface 540. The processor 510 can control the output interface 540 to communicate with other devices or chips, and specifically, can output information or data to other devices or chips.

Optionally, the chip can be applied to the network device in the embodiments of the present disclosure, and the chip can implement the corresponding processed which are implemented by the network device in the methods of the embodiments of the present disclosure. For the sake of brevity, a repetition will be omitted here.

Optionally, the chip can be applied to the mobile terminal device/terminal device in the embodiments of the present disclosure, and the chip can implement the corresponding processed which are implemented by the mobile terminal device/terminal device in the methods of the embodiments of the present disclosure. For the sake of brevity, a repetition will be omitted here.

It should be understood that the chip mentioned in the embodiments of the present disclosure can also be referred to as a system-level chip, a system chip, a chip system, or a system-on-chip.

The embodiments of the present disclosure also provide a computer-readable storage medium for storing a computer program.

Optionally, the computer-readable storage medium can be applied to the terminal device in the embodiments of the present disclosure, and the computer program causes a computer to perform the corresponding processes which are implemented by the terminal device in the methods of the embodiments of the present disclosure. For the sake of brevity, a repetition will be omitted here.

The embodiments of the present disclosure also provide a computer program product including computer program instructions.

Optionally, the computer program product can be applied to the terminal device in the embodiments of the present disclosure, and the computer program instructions cause a computer to perform the corresponding processes which are implemented by the terminal device in the methods of the embodiments of the present disclosure. For the sake of brevity, a repetition will be omitted here.

The embodiments of the present disclosure also provides a computer program.

Optionally, the computer program can be applied to the terminal device in the embodiments of the present disclosure, and when being executed on a computer, causes the computer to perform the corresponding processes implemented by the mobile terminal device/terminal device in the methods of the embodiments of the present disclosure. For the sake of brevity, a repetition will be omitted here.

Those of ordinary skill in the art can realize that the exemplary units and algorithm steps described in connection with the embodiments disclosed herein can be implemented in electronic hardware, or a combination of computer software and the electronic hardware. Whether these functions are implemented in hardware or software depends on the specific application of the technical solution and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

According to the embodiments provided in the present disclosure, it should be understood that the systems, devices, and methods disclosed can be implemented in other manners. For example, the device embodiments described above are merely illustrative. For example, the division of the units is only a logical function division, and in actual implementations, there can be other divisions. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may or may not be physically separated, and the components shown as units may or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into a processing unit, or individually exist physically, or two or more of the units can be integrated into one unit.

If implemented in the form of software functional units and sold or used as an independent product, the functions can be stored in a computer-readable storage medium. Based on such an understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in this disclosure shall fall within the scope of the present disclosure. Therefore, the protection scope of the present disclosure shall be defined by the claims.

What is claimed is:

1. A downlink signal transmission method, comprising:
   determining, by a terminal device, that at least two downlink signals are to be received in a first detection window;
   determining, by the terminal device, a receiving scheme of the at least two downlink signals based on transmission information of the at least two downlink signals, wherein the transmission information comprises at least one of schedule information of the at least two downlink signals, transmission configurations of the at least two downlink signals, and information carried in the at least two downlink signals; and
   receiving, by the terminal device, at least one downlink signal of the at least two downlink signals in the first detection window based on the receiving scheme of the at least two downlink signals,
   wherein the determining, by the terminal device, the receiving scheme of the at least two downlink signals based on the transmission information of the at least two downlink signals comprises:
   determining, by the terminal device, the receiving scheme of the at least two downlink signals based on a number of antenna panels in the terminal device and the transmission information of the at least two downlink signals, wherein the determining, by the terminal device, the receiving scheme of the at least two downlink signals based on the number of antenna panels in the terminal device and the transmission information of the at least two downlink signals comprises:

selecting, by the terminal device, a number K of downlink signals with highest priorities from a number N of downlink signals based on the transmission information of the N downlink signals when the number K of the antenna panels is less than the number N of the at least two downlink signals, and determining to receive the K downlink signals by using the transmission configurations of the K downlink signals, respectively.

2. The method according to claim 1, wherein:
physical resources occupied by different downlink signals in the at least two downlink signals overlap;
reference signals included in TCI states of different downlink signals in the at least two downlink signals are different;
reference signals with Quasi Co-Located (QCL) type D included in the TCI states of different downlink signals in the at least two downlink signals are different; and/or
the reference signals with QCL type D included in the TCI states of different downlink signals in the at least two downlink signals are not Quasi-Co-Located.

3. The method according to claim 1, wherein each of the at least two downlink signals is scheduled by a separate DCI.

4. The method according to claim 1, wherein the transmission information comprises the scheduling information of the at least two downlink signals, and the determining, by the terminal device, the receiving scheme of the at least two downlink signals based on the transmission information of the at least two downlink signals comprises:

determining, by the terminal device, the receiving scheme of the at least two downlink signals based on a receiving order of DCIs that schedule the at least two downlink signals;

determining, by the terminal device, the receiving scheme of the at least two downlink signals based on a DCI format of the DCIs that schedule the at least two downlink signals;

determining, by the terminal device, the receiving scheme of the at least two downlink signals based on a scrambling scheme of Cyclic Redundancy Check (CRC) of the DCIs that schedule the at least two downlink signals;

determining, by the terminal device, the receiving scheme of the at least two downlink signals based on a search space or a control resource set including the DCIs that schedule the at least two downlink signals; and/or determining, by the terminal device, the receiving scheme of each downlink signal of the at least two downlink signals based on a time offset between the DCI that schedules each downlink signal of the at least two downlink signals and the downlink signal scheduled by the DCI.

5. The method according to claim 4, wherein the determining, by the terminal device, the receiving scheme of each downlink signal of the at least two downlink signals based on the time offset between the DCI that schedules each downlink signal of the at least two downlink signals and the downlink signal scheduled by the DCI comprises:

determining, by the terminal device, the receiving scheme of each downlink signal of the at least two downlink signals based on whether the time offset between the DCI that schedules each downlink signal of the at least two downlink signals and the downlink signal scheduled by the DCI is greater than a first preset time threshold or not.

6. The method according to claim 1, wherein the transmission information comprises the transmission configurations of the at least two downlink signals, and the determining, by the terminal device, the receiving scheme of the at least two downlink signals based on the transmission information of the at least two downlink signals comprises:

determining, by the terminal device, the receiving scheme of the at least two downlink signals based on whether TCI states of the at least two downlink signals include a reference signal with QCL type D or not;

determining, by the terminal device, the receiving scheme of the at least two downlink signals based on a type of a reference signal included in the TCI states of the at least two downlink signals;

determining, by the terminal device, the receiving scheme of the at least two downlink signals based on a type of the reference signal with QCL type D included in the TCI states of the at least two downlink signals;

determining, by the terminal device, the receiving scheme of the at least two downlink signals based on a mapping type of the at least two downlink signals; and/or determining, by the terminal device, the receiving scheme of the at least two downlink signals based on a duration of the at least two downlink signals.

7. The method according to claim 1, wherein the transmission information comprises the information carried in the at least two downlink signals, and the determining, by the terminal device, the receiving scheme of the at least two downlink signals based on the transmission information of the at least two downlink signals comprises:

determining, by the terminal device, the receiving scheme of the at least two downlink signals based on whether system information is carried in the at least two downlink signals or not; and/or determining, by the terminal device, the receiving scheme of the at least two downlink signals based on whether high-layer signaling is carried in the at least two downlink signals or not.

8. The method according to claim 1, wherein the determining, by the terminal device, the receiving scheme of the at least two downlink signals based on the transmission information of the at least two downlink signals comprises:

determining, by the terminal device based on the transmission information of the at least two downlink signals, whether to receive at least one of the at least two downlink signals; and/or determining, by the terminal device, the transmission configuration for receiving the at least one of the at least two downlink signals based on the transmission information of the at least two downlink signals.

9. The method according to claim 1, wherein the determining, by the terminal device, the receiving scheme of the at least two downlink signals based on the number of antenna panels in the terminal device and the transmission information of the at least two downlink signals comprises:

determining, by the terminal device, to receive the N downlink signals by using the transmission configurations of the N downlink signals, respectively, when the number K of the antenna panels is greater than or equal to the number N of the at least two downlink signals.

10. The method according to claim 1, wherein the transmission configuration comprises:

a receiving beam used for receiving a corresponding
downlink signal;
a reference signal with QCL type D used for receiving the
corresponding downlink signal;
a TCI state used for receiving the corresponding downlink
signal;
a mapping type assumed for receiving the corresponding
downlink signal; and/or
a time window used for receiving the corresponding
downlink signal.

11. The method according to claim 1, wherein the downlink signal comprises a Physical Downlink Shared Channel (PDSCH), a Physical Downlink Control Channel (PDCCH) or a Channel State Information Reference Signal (CSI-RS).

12. The method according to claim 1, wherein the first detection window comprises:
a slot;
at least two slots;
an Orthogonal Frequency Division Multiplexing (OFDM) symbol; or
at least two OFDM symbols.

13. A terminal device, comprising:
a processor; and
a memory for storing instructions executable by the processor, wherein when the instructions are executed by the processor, the terminal device is configured to:
determine that at least two downlink signals are to be received in a first detection window;
determine a receiving scheme of the at least two downlink signals based on transmission information of the at least two downlink signals, wherein the transmission information comprises at least one of schedule information of the at least two downlink signals, transmission configurations of the at least two downlink signals, and information carried in the at least two downlink signals; and
receive at least one of the at least two downlink signals in the first detection window based on the receiving scheme of the at least two downlink signals,
wherein when the instructions are executed by the processor, the terminal device is further configured to determine the receiving scheme of the at least two downlink signals based on a number of antenna panels in the terminal device and the transmission information of the at least two downlink signals, and
wherein when the instructions are executed by the processor, the terminal device is further configured to select a number K of downlink signals with highest priorities from a number N of downlink signals based on the transmission information of the N downlink signals when the number K of the antenna panels is less than the number N of the at least two downlink signals, and determine to receive the K downlink signals by using the transmission configurations of the K downlink signals, respectively.

14. The terminal device according to claim 13, wherein:
physical resources occupied by different downlink signals in the at least two downlink signals overlap;
reference signals included in TCI states of different downlink signals of the at least two downlink signals are different;
reference signals with Quasi Co-Located (QCL) type D included in the TCI states of different downlink signals in the at least two downlink signals are different; and/or
the reference signals with QCL type D included in the TCI states of different downlink signals in the at least two downlink signals are not Quasi-Co-Located.

15. The terminal device according to claim 13, wherein the transmission information comprises the scheduling information of the at least two downlink signals, and the terminal device is further configured to:
determine the receiving scheme of the at least two downlink signals based on a receiving order of DCIs that schedule the at least two downlink signals;
determine the receiving scheme of the at least two downlink signals based on a DCI format of the DCIs that schedule the at least two downlink signals;
determine the receiving scheme of the at least two downlink signals based on a scrambling scheme of Cyclic Redundancy Check (CRC) of the DCIs that schedule the at least two downlink signals;
determine the receiving scheme of the at least two downlink signals based on a search space or a control resource set including the DCIs that schedule the at least two downlink signals; and/or
determine the receiving scheme of each downlink signal of the at least two downlink signals based on a time offset between the DCI that schedules each downlink signal of the at least two downlink signals and the downlink signal scheduled by the DCI.

16. The terminal device according to claim 15, wherein the terminal device is further configured to:
determine the receiving scheme of each downlink signal of the at least two downlink signals based on whether the time offset between the DCI that schedules each downlink signal of the at least two downlink signals and the downlink signal scheduled by the DCI is greater than a first preset time threshold or not.

17. The terminal device according to claim 13, wherein the transmission information comprises the transmission configurations of the at least two downlink signals, and the terminal device is further configured to:
determine the receiving scheme of the at least two downlink signals based on whether TCI states of the at least two downlink signals include a reference signal with QCL type D or not;
determine the receiving scheme of the at least two downlink signals based on a type of a reference signal included in the TCI states of the at least two downlink signals;
determine the receiving scheme of the at least two downlink signals based on a type of the reference signal with QCL type D included in the TCI states of the at least two downlink signals;
determine the receiving scheme of the at least two downlink signals based on a mapping type of the at least two downlink signals; and/or
determine the receiving scheme of the at least two downlink signals based on a duration of the at least two downlink signals.

18. The terminal device according to claim 13, wherein the transmission information comprises the information carried in the at least two downlink signals, and the terminal device is further configured to:
determine the receiving scheme of the at least two downlink signals based on whether system information is carried in the at least two downlink signals or not; and/or
determine the receiving scheme of the at least two downlink signals based on whether high-layer signaling is carried in the at least two downlink signals or not.

19. The terminal device according to claim 13, wherein the terminal device is further configured to:

determine, based on the transmission information of the at least two downlink signals, whether to receive at least one of the at least two downlink signals; and/or determine the transmission configuration for receiving the at least one of the at least two downlink signals based on the transmission information of the at least two downlink signals.

20. A non-transitory computer-readable storage medium for storing a computer program that causes a terminal device to perform a downlink signal transmission method, the method comprising:

determining, by the terminal device, that at least two downlink signals are to be received in a first detection window;

determining, by the terminal device, a receiving scheme of the at least two downlink signals based on transmission information of the at least two downlink signals, wherein the transmission information comprises at least one of schedule information of the at least two downlink signals, transmission configurations of the at least two downlink signals, and information carried in the at least two downlink signals; and receiving, by the terminal device, at least one downlink signal of the at least two downlink signals in the first detection window based on the receiving scheme of the at least two downlink signals, wherein the determining, by the terminal device, the receiving scheme of the at least two downlink signals based on the transmission information of the at least two downlink signals comprises:

determining, by the terminal device, the receiving scheme of the at least two downlink signals based on a number of antenna panels in the terminal device and the transmission information of the at least two downlink signals, wherein the determining, by the terminal device, the receiving scheme of the at least two downlink signals based on the number of antenna panels in the terminal device and the transmission information of the at least two downlink signals comprises:

selecting, by the terminal device, a number K of downlink signals with highest priorities from a number N of downlink signals based on the transmission information of the N downlink signals when the number K of the antenna panels is less than the number N of the at least two downlink signals, and determining to receive the K downlink signals by using the transmission configurations of the K downlink signals, respectively.

* * * * *